United States Patent
Lee et al.

(10) Patent No.: US 7,688,357 B2
(45) Date of Patent: Mar. 30, 2010

(54) METHOD AND APPARATUS FOR COLOR TEMPERATURE CORRECTION IN A BUILT-IN CAMERA OF A PORTABLE TERMINAL

(75) Inventors: Seung-Cheol Lee, Suwon-si (KR); Gun-Chul Song, Seoul (KR); Hee-Deog Kim, Seongnam-si (KR); Sang-Woo Ryu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 663 days.

(21) Appl. No.: 11/581,885

(22) Filed: Oct. 17, 2006

(65) Prior Publication Data
US 2007/0091185 A1    Apr. 26, 2007

(30) Foreign Application Priority Data
Oct. 20, 2005    (KR)    .................... 10-2005-0099072

(51) Int. Cl.
*H04N 9/73*    (2006.01)
*G06K 9/00*    (2006.01)
*G03F 3/08*    (2006.01)

(52) U.S. Cl. .................... 348/223.1; 348/655; 382/167; 382/168; 358/522

(58) Field of Classification Search .............. 348/223.1; 382/173, 162, 168, 169, 272, 275
See application file for complete search history.

(56) References Cited

U.S. PATENT DOCUMENTS

| | | | | |
|---|---|---|---|---|
| 5,874,988 | A * | 2/1999 | Gu | 348/97 |
| 6,377,703 | B1 * | 4/2002 | Yeung | 382/173 |
| 6,507,667 | B1 * | 1/2003 | Hsieh et al. | 382/167 |
| 6,919,924 | B1 * | 7/2005 | Terashita | 348/223.1 |
| 7,102,669 | B2 * | 9/2006 | Skow | 348/222.1 |
| 7,146,041 | B2 * | 12/2006 | Takahashi | 382/167 |
| 7,184,080 | B2 * | 2/2007 | Kehtarnavaz et al. | 348/223.1 |
| 2004/0022433 | A1 * | 2/2004 | Acharya et al. | 382/165 |

* cited by examiner

*Primary Examiner*—Nhan T Tran
*Assistant Examiner*—Quang V Le
(74) *Attorney, Agent, or Firm*—The Farrell Law Firm, LLP

(57) ABSTRACT

A method and apparatus for auto white balance in a portable terminal is provided. The method includes analyzing a captured image with histograms of red, green, and blue channels and a histogram of a gray channel; determining whether the histogram of the RGB channels and the histogram of the gray channel overlap over a predetermined percentage; measuring each color distribution average value of the RGB channels when the histogram of the RGB channels and the histogram of the gray channel overlap over a predetermined percentage; and performing color temperature correction using the color distribution average value measured in each of the RGB channels.

14 Claims, 6 Drawing Sheets

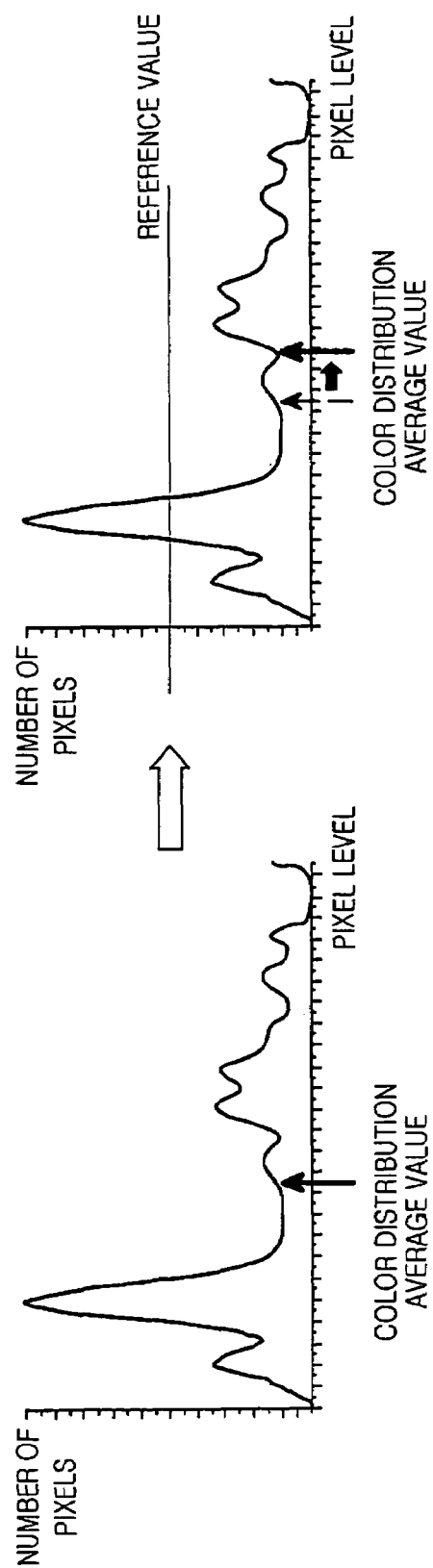

METHOD AND APPARATUS FOR COLOR TEMPERATURE CORRECTION IN A BUILT-IN CAMERA OF A PORTABLE TERMINAL

PRIORITY

This application claims priority under 35 U.S.C. § 119 to an application filed in the Korean Intellectual Property Office on Oct. 20, 2005 and allocated Serial No. 2005-99072, the contents of which are incorporated herein by reference.

BACKGROUND OF THE INVENTION

1. Field of the Invention

The present invention relates generally to an auto white balance (AWB) technology which is a color temperature correction technology in a built-in camera of a portable terminal; and in particular, to a method and apparatus for preventing a color correction error for an AWB when a single color is input to a major part of a window of an imaging device such as a charge-coupled device (CCD) of the built-in camera when taking a picture with a portable terminal.

2. Description of the Related Art

Portable terminals such as a mobile communication terminal, personal digital assistants (PDAs), an MP3 (MPEG layer-3) player and electronic notebook are widely used. Applications for these devices are continually widening. For example, portable terminals can provide a number of functions including, but not limited to, telephone call function, scheduling function, image photographing function using a built-in camera, satellite broadcasting service, document editing function and game function.

A built-in digital camera in a portable terminal is configured to digitize ambient light reflected from an object through its lens. Due to influence of the light source, shades of blue are changed into blue and shades of red are changed into red. Accordingly, the digital camera has to express color temperature independently of the ambient light source. For this purpose, the portable terminal having a built-in camera performs an auto white balance (AWB) function on an image. The AWB is automatic color temperature correction or compensation.

A built-in camera in a portable terminal will be described below with reference to FIG. 1 which illustrates a conventional built-in camera in a portable terminal.

Referring to FIG. 1, the camera includes a sensing unit 100, a black level and crop unit 102, a defect correction unit 104, a demosaic unit 106, a white balance correction unit 108, a gamma correction unit 110, and a color conversion unit 112.

The sensing unit 100 is an imaging device (e.g., a charge coupled device (CCD) or complementary metal oxide semiconductor (CMOS) image sensor) designed to receive optical signal from an object and convert the optical signal into an electric signal. The electrical signal includes red (R), green (G), and blue (B) channels.

The black level and crop unit 102 corrects errors in the overall brightness of an image.

The defect correction unit 104 searches defective pixels among pixels having a zero level obtained by screening light just before receiving the light and determines the positions of the pixels, and then corrects values of the already-known defective pixels with respect to the image obtained by receiving the light.

The demosaic unit 106 converts an RGB pattern of a bayer form into an RGB form of independent channels.

The white balance correction unit 108 extracts video signals from a CCD window that can be regarded as gray, divides the extracted signal into R and B components of an average signal, and then determines a color temperature according to a component ratio. Additionally, the gain of the R and B components in the video signal is controlled to follow a locus of the color temperature change in black body radiation, and to allow the ratio of R and B to be one. AWB performs a color temperature correction in comparison with an average signal value in a white portion and a reference signal value corresponding to R−B=0 in a color temperature.

An appropriate gamma factor is applied to compensate for actual human eye color sensation in the gamma correction unit 110 because color sense varies according to the properties of the gamma correction unit 110 and the sensing unit 100.

The color conversion unit 112 converts image data of an RGB pattern into YUV format that represents three information (Y: brightness signal, U: difference of signal brightness and a red component, V: difference of signal brightness and a blue component).

A stand-alone digital camera includes an additional hardware component for color correction to output a natural image. Unlike the digital camera, the portable terminal with a built-in camera performs AWB using software rather than an additional component for color correction. Thus, AWB of the terminal misjudges colors that occupy a major portion of a gray screen (window) in during a close shot or when capturing the sea, sky, grass, or forest. This causes color correction errors.

A single color in which color correction errors may easily occur is a yellow or green. That is, when a green or a yellow color occupies an entire screen when taking a picture of grass or human face, AWB performs color sense correction by treating colors other than white as a white color. Accordingly, due to the color correction error, an unnatural image may be displayed.

Furthermore, since conventional AWB of the portable terminal performs a color temperature correction on an image that does not require the color temperature correction, an unnatural image may also be displayed.

Therefore, AWB needs to determine whether a color temperature correction is required or not, and then measure an accurate gray for performing a color temperature correction without an additional hardware device.

SUMMARY OF THE INVENTION

An object of the present invention is to solve at least the above problems and compensate for the disadvantages by at least providing the advantages below. Accordingly, an object of the present invention is to provide a method for enhanced AWB in a portable terminal.

Another object of the present invention is to provide a method for AWB in a portable terminal using an average value except for a portion where the number of pixels in each level is larger than a predetermined number after dividing each of the RGB channels into a plurality of levels.

According to one aspect of the present invention, a method for AWB in a portable terminal includes analyzing a captured image with histograms of red, green, and blue channels and a histogram of a gray channel; determining whether the histogram of the RGB channels and the histogram of the gray channel overlap over a predetermined percentage; measuring each color distribution average value of the RGB channels when the histogram of the RGB channels and the histogram of the gray channel overlap over a predetermined percentage;

and performing a color temperature correction using the color distribution average value measured in each of the RGB channels.

BRIEF DESCRIPTION OF THE DRAWINGS

The above and other objects, features and advantages of the present invention will become more apparent from the following detailed description when taken in conjunction with the accompanying drawings in which:

FIG. 4 shows a graph illustrating a method for measuring a color distribution average value for a color temperature correction according to the present invention;

DETAILED DESCRIPTION OF THE PREFERRED EMBODIMENT

Preferred embodiment of the present invention will be described herein below with reference to the accompanying drawings. In the following description, well-known functions or constructions are not described in detail since they would obscure the invention.

A method for auto white balance (AWB) in a portable terminal will be described with reference to FIGS. 2 through 6.

Figure 2:
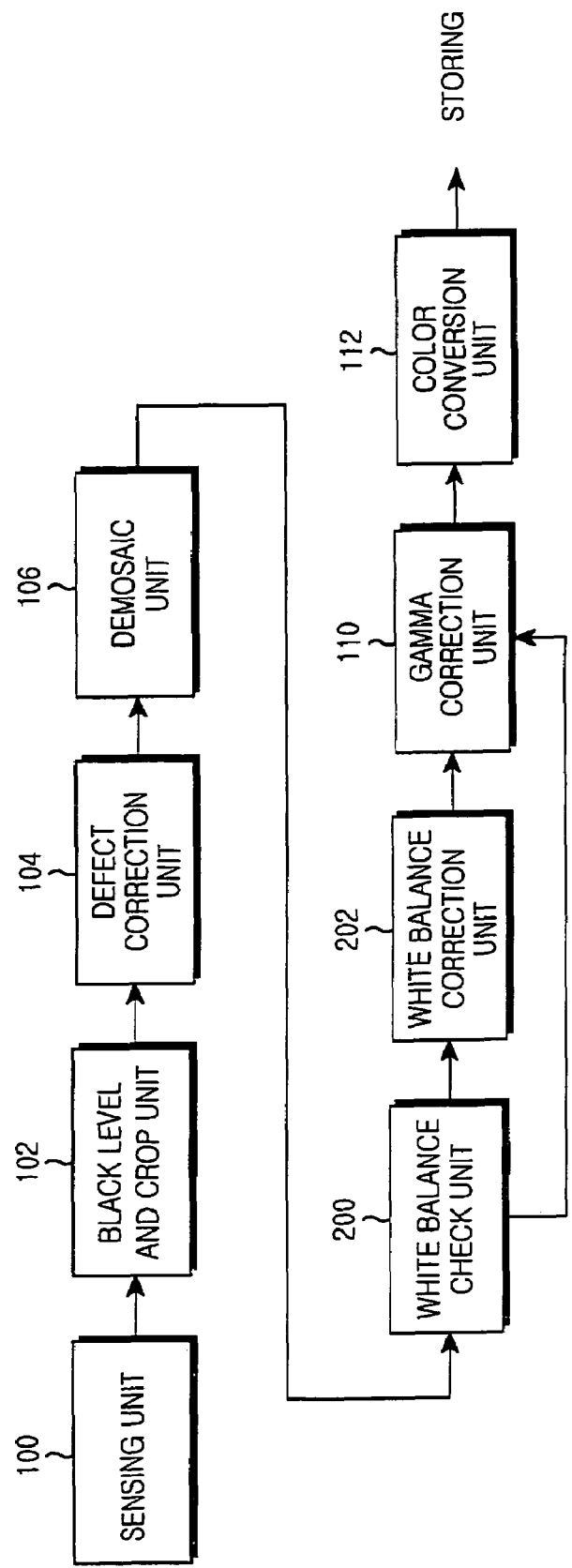
FIG. 2 shows a block diagram of a built-in camera including a white balance check unit in a portable terminal according to the present invention.

FIG. 2 shows a block diagram of a built-in camera including a white balance check unit in a portable terminal according to the present invention.

Figure 1:
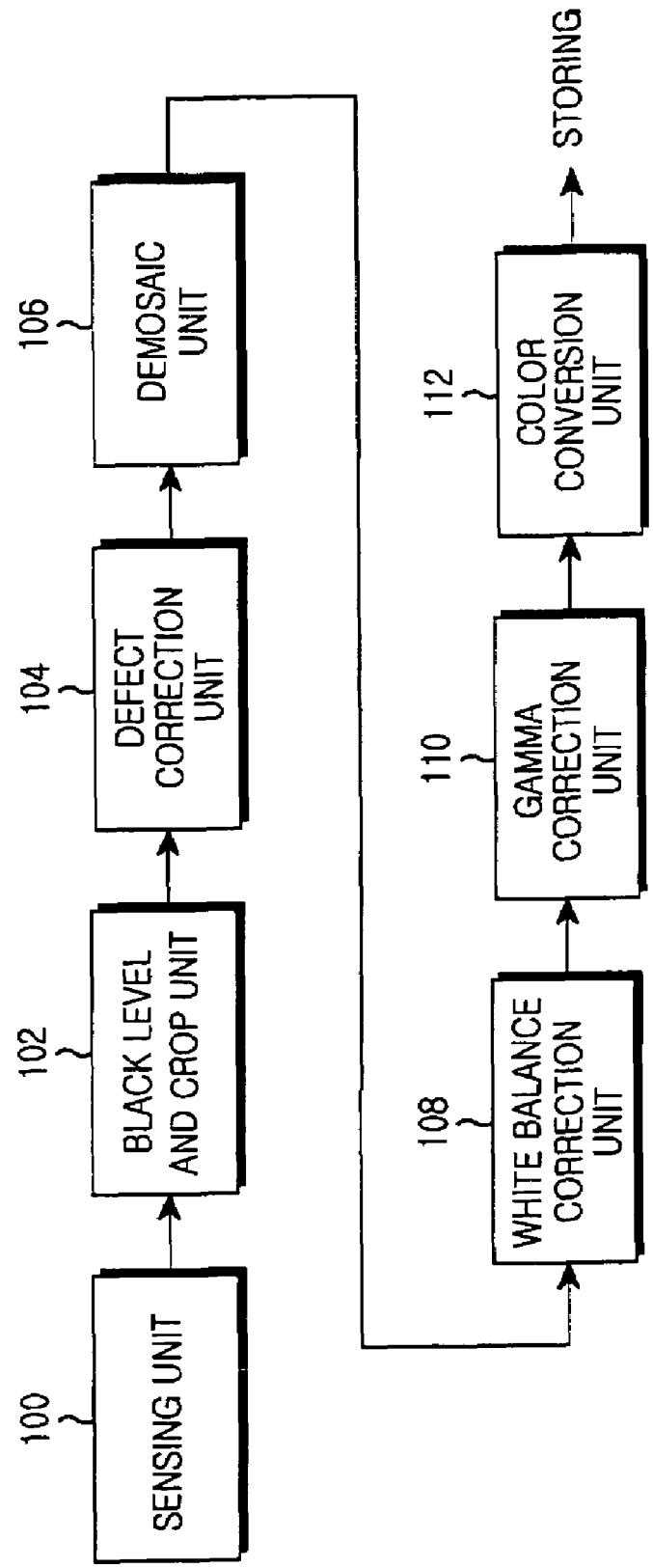
FIG. 1 shows a block diagram of a conventional built-in camera in a portable terminal.

Referring to FIG. 2, a camera in the portable terminal includes a sensing unit 100, a black level and crop unit 102, a defect correction unit 104, a demosaic unit 106, a white balance check unit 200, a white balance correction unit 202, a gamma correction unit 110, and a color conversion unit 112. Elements identical to that of the portable terminal of FIG. 1 will be omitted for conciseness, and only modified or added elements will be described.

The white balance check unit 200 receives an image signal expressed in histograms of an RGB area and a gray area, and then confirms that a gray component exists in the received image signal by overlapping gray and RGB in a predetermined percentage. Next, the white balance check unit 200 determines whether the image requires color temperature correction or not, and then transmits the image signal to the white balance correction unit 202 when the image requires color temperature correction. If not, the white balance check unit 200 transmits the image signal to the gamma correction unit 110. Determination of the color temperature correction will be described with reference to FIG. 3.

Figure 3A:
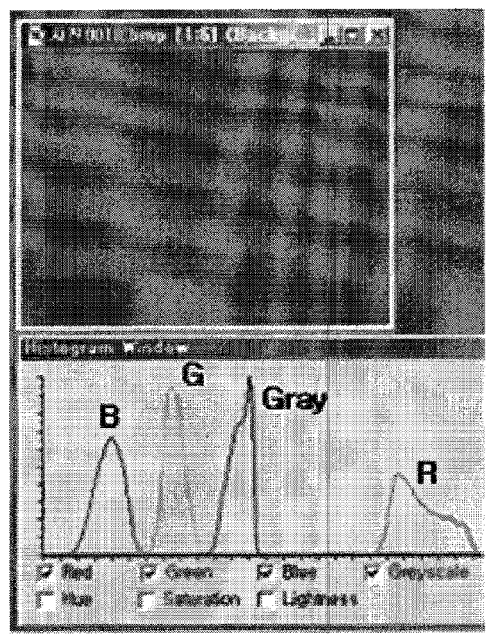
FIG. 3A shows a graph depicting gray without overlapping RGB and gray according to the result of a color temperature correction testing unit.

FIG. 3A shows an image and a graph depicting gray without overlapping RGB and gray according to the result of a color temperature correction testing unit.

Figure 3B:
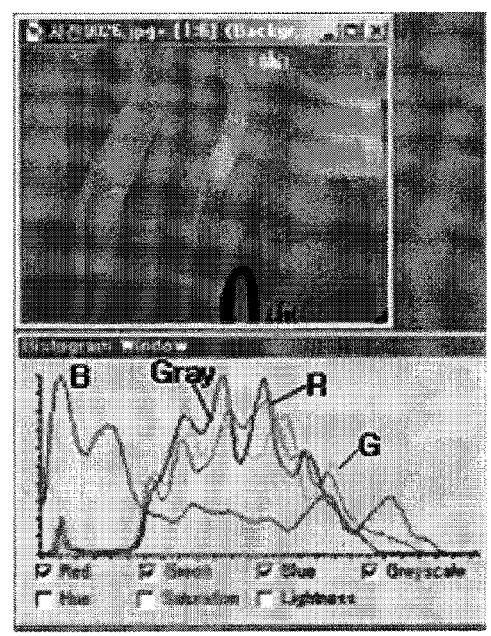
FIG. 3B shows a graph depicting gray overlapping RGB and a predetermined 10% of a gray area according to the result of a color temperature correction testing unit.

FIG. 3B shows an image and a graph depicting gray overlapping RGB and a predetermined 10% of a gray area according to the result of a color temperature correction testing unit.

The white balance correction unit 202 can make gray judgment errors in calculating the normal color distribution when a specific color occupies a large area in the image. When the same color exists in the image over a predetermined value, a portion of the same color is excluded from the color distribution average value measurement, and then color temperature correction is performed using the color distribution average value.

A method for measuring a color distribution average value will be described with reference FIG. 4. Also, a color distribution correction method is described in Equation (1).

FIG. 4 shows a graph illustrating a method for measuring a color distribution average value for a color temperature correction according to the present invention.

Referring to FIG. 4, a color distribution average value for the color temperature correction can be obtained by dividing each RGB into respective 256 levels, and then averaging an area except for a portion having the number of pixels larger than a predetermined number in each level.

A color temperature correction method using the color distribution average value in each RGB is described in Equation (1):

when $x[i] \leq avg$, then $x'[i]=(e/avg)*x[i]$, and when $x[i] > avg$, then $x'[i]=255-((max-e)/(max-avg))*x[i]$.

(However, when $x'[i]>255$, then $x'[i]=255$, and when $x'[i]<0, x'[i]=0$.) (1)

where x'[i] is a color level value of $i^{th}$ pixel in a color temperature corrected image, e is a total energy (total average of RGB channels), avg is a color distribution average value obtained by averaging an area except for a portion having a number of pixels in each level larger than a predetermined number after dividing each RGB channels into respective 256 levels, x[i] is a color level value of $i^{th}$ pixel in the image, and max is 256, that is, the maximum color level value that the pixel can have).

An AWB imaging method in a portable terminal according to the present invention will be described with reference to FIG. 5.

Figure 5:
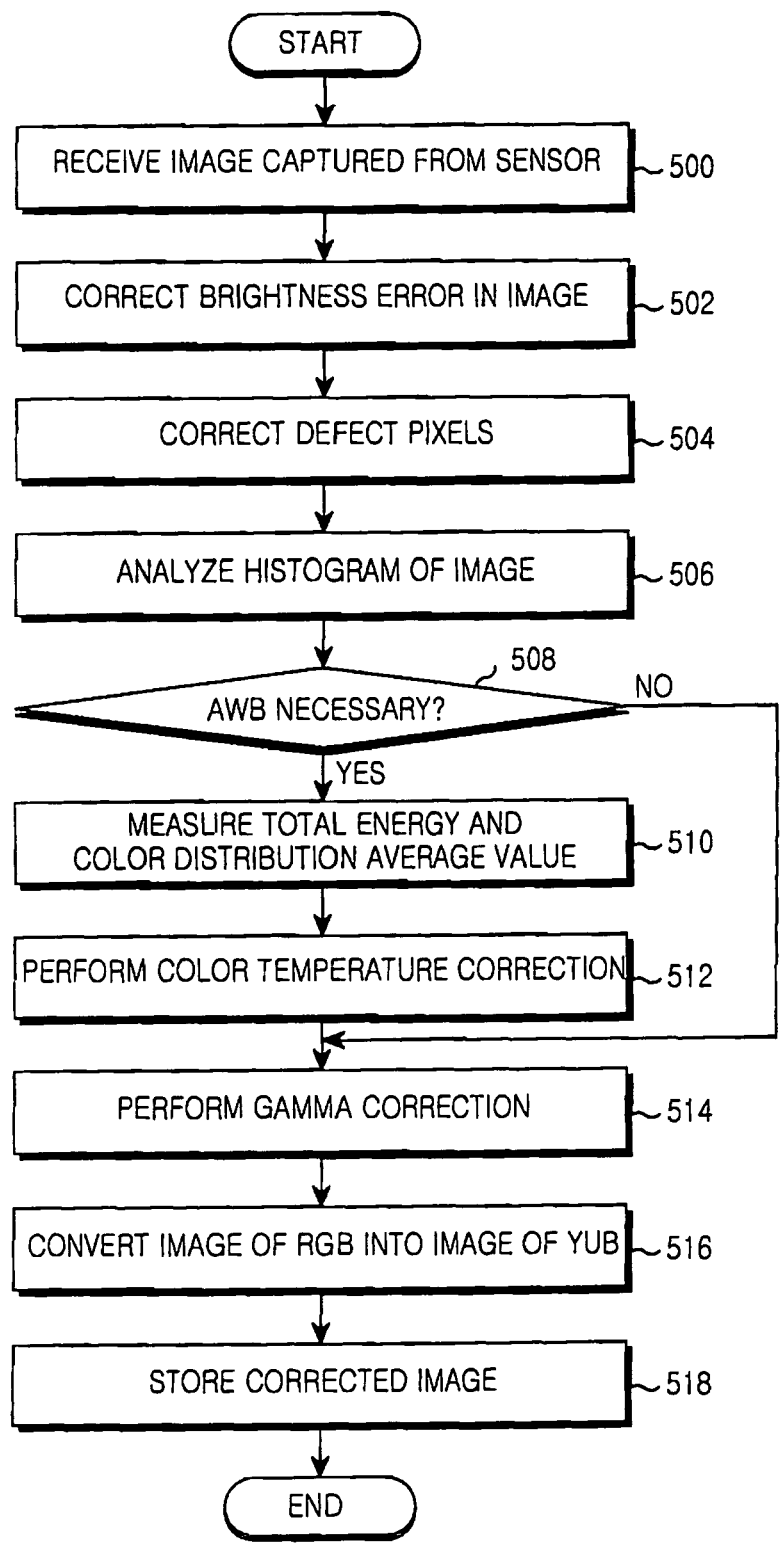
FIG. 5 shows a flowchart of an AWB imaging flow according to the present invention.

FIG. 5 is the flowchart of an AWB imaging flow according to the present invention.

An imaging device in the portable terminal according to the present invention receives an image to be stored from a sensing unit during the process of taking a picture in step 500. In step 502, the image device corrects brightness errors in the image, and then tests and corrects defect pixels in step 504. In step 506, the image device analyzes each histogram of RGB and gray. In step 508, the imaging device determines whether to perform a color temperature correction by determining whether an overlapping portion of histograms in an RGB area and a gray area is over a predetermined percentage.

When the overlapping portion of the histograms is below the predetermined percentage, and thus the color temperature correction is unnecessary, the imaging device proceeds to step 514 which is described below.

When the overlapping portion of the histograms is over the predetermined percentage, and thus color temperature correction is necessary, the imaging device measures the entire energy of the image and the color distribution average value (an average of values below a predetermined reference value) in step 510. In step 512, the imaging device performs color temperature correction on each color of RGB using the color distribution average value in Equation (1), and then performs gamma correction considering property of the sensing unit. In step 516, the imaging device converts the image data of the RGB pattern into a YUV format that represents brightness signal as Y, difference of signal brightness and a red component as U, and difference of signal brightness and a blue component as V. Then, the imaging device stores the converted image in step 518.

Figure 6A:
FIG. 6A shows an image captured by a portable terminal using a color temperature correction method according to the present invention.
Figure 6B:
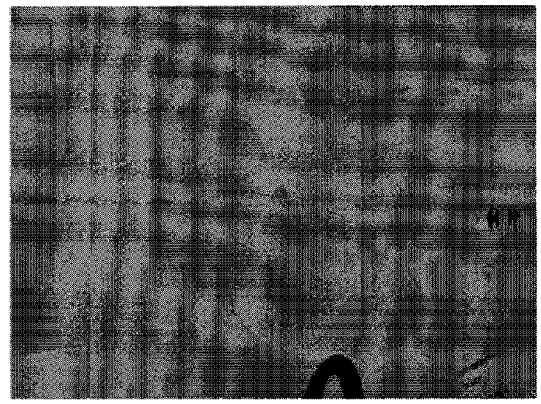
FIG. 6B shows an image captured by a portable terminal using a conventional color temperature correction method.

Captured images according to a conventional color temperature correction and the present invention will be compared with reference to FIGS. 6A and 6B.

FIG. 6A shows an image captured by a portable terminal using color temperature correction method according to the present invention.

FIG. 6B shows an image captured by a portable terminal using a conventional color temperature correction method.

Referring to FIG. 6B, due to the influence of an orange-red color occupying most of the image, the B value in RGB is incorrectly measured so that gray is distorted into blue.

On the other hand, in FIG. 6A, the gray area looks more natural. This effect is obtained when measuring a color distribution average value by removing pixels that are not within the specific level of the concentrated distribution of an orange-red color reference value.

Alternate embodiments of the present invention can also comprise computer readable codes incorporated on a tangible computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs). The computer readable medium can also be distributed over network coupled computer systems so that the computer readable code is stored and executed in a distributed fashion. Also, functional programs, codes, and code segments for accomplishing the present invention may be construed by programmers of ordinary skill in the art to which the present invention pertains.

According to the present invention, there is provided a method for auto white balance capable of preventing color correction errors in a portable terminal when a single input color is registered by the CCD during the process of taking a picture. Therefore, the portable terminal may provide more natural color images.

While the invention has been shown and described with reference to certain preferred embodiments thereof, it will be understood by those skilled in the art that various changes may be made therein without departing from the spirit and scope of the invention as further defined by the appended claims.

What is claimed is:

1. A method for color temperature correction in a portable terminal having a built-in camera, comprising the steps of:
analyzing a captured image with histograms of red, green, blue, and gray channel;
determining whether the histogram of the RGB channels and the histogram of the gray channel overlap over a predetermined percentage;
measuring each color distribution average value of the RGB channels if the histogram of the RGB channels and the histogram of the gray channel overlap over a predetermined percentage; and
performing a color temperature correction using the color distribution average value measured in each of the RGB channels on the captured image.

2. The method of claim 1, wherein if the histograms of the RGB channels and the histogram of the gray channel do not overlap over a predetermined percentage, the color temperature correction is not performed.

3. The method of claim 1, further comprising dividing each of the RGB channels into a plurality of levels,
wherein the color distribution average value is an average value except for a portion where a number of pixels in each level is greater than a predetermined number.

4. The method of claim 1, wherein the color temperature correction method using the color distribution average value in each RGB is modeled using:

$$x'[i]=(e/\text{avg})*x[i] \text{ when } x[i] \leq \text{avg and}$$

$$x'[i]=255-((\max-e)/(\max-\text{avg}))*x[i] \text{ when } x[i]>\text{avg}$$

(However, $x'[i]=255$ when $x'[i]>255$, and when $x'[i]<0, x'[i]=0$.)

where $x'[i]$ is a color level value of $i^{th}$ pixel in a color temperature corrected image, e is the total energy (total average of RGB channels), avg is a color distribution average value obtained by averaging an area except for a portion having a number of pixels in each level larger than a predetermined number after dividing each RGB channels into respective 256 levels, $x[i]$ is a color level value of $i^{th}$ pixel in the image, and max is a maximum color level value that the pixel can have.

5. A method for color temperature correction in a portable terminal having a built-in camera, comprising the steps of:
analyzing a captured image with histograms of red, green, blue and gray channel;
determining if the histogram of the RGB channels and the histogram of the gray channel overlap over a predetermined percentage; and
performing color temperature correction on the captured image if the histogram of the RGB channels and the histogram of the gray channel overlap over a predetermined percentage.

6. The method of claim 5, wherein if the histograms of the RGB channels and the histogram of the gray channel do not overlap over a predetermined percentage color temperature correction is not performed.

7. A portable terminal having a built-in camera capable of color temperature correction comprising:
a white balance check unit for analyzing a captured image with histograms of red, green, blue and gray channels, determining if the histogram of the RGB channels and the histogram of the gray channel overlap over a predetermined percentage, measuring each color distribution average value of the RGB channels if the histogram of the RGB channels and the histogram of the gray channel overlap over a predetermined percentage, and outputting the captured image and measuring each color distribution average value of the RGB channels; and
a white balance correction unit for performing color temperature correction using the color distribution average value measured in each of the RGB channels on the captured image.

8. The portable terminal of claim 7, wherein the white balance check unit divides each of the RGB channels into a plurality of levels and wherein the color distribution average value is an average value except for a portion where a number of pixels in each level is greater than a predetermined number.

9. The portable terminal of claim 7, wherein the color temperature correction method using the color distribution average value in each RGB is modeled using:

$$x'[i]=(e/\text{avg})*x[i], \text{ when } x[i] \leq \text{avg, and}$$

$$x'[i]=255-((\text{max}-e)/(\text{max}-\text{avg}))*x[i] \text{ when } x[i]>\text{avg.}$$

(However, when $x'[i]>255$, then $x'[i]=255$, and when $x'[i]<0, x'[i]=0$.)

where x'[i] is a color level value of $i^{th}$ pixel in a color temperature corrected image, e is the total energy (total average of RGB channels), avg is a color distribution average value obtained by averaging an area except for a portion having a number of pixels in each level larger than a predetermined number after dividing each RGB channels into respective 256 levels, x[i] is a color level value of $i^{th}$ pixel in the image, and max is a maximum color level value that the pixel can have.

10. A portable terminal having a built-in camera for color temperature correction comprising:
- a white balance check unit for analyzing a captured image with histograms of red, green, blue and gray channels, determining whether the histogram of the RGB channels and the histogram of the gray channel overlap over a predetermined percentage, and outputting the captured image without performing color temperature correction if the histogram of the RGB channels and the histogram of the gray channel do not overlap over a predetermined percentage; and
- a gamma correction unit for gamma correcting the captured image from the white balance check unit.

11. A portable terminal having a built-in camera for color temperature correction comprising, comprising:
- a white balance check unit for analyzing a captured image with histograms of red, green, blue and gray channels and determining whether the histogram of the RGB channels and the histogram of the gray channel overlap over a predetermined percentage, and outputting the captured image; and
- a white balance correction unit for performing a color temperature correction on the captured image if the histogram of the RGB channels and the histogram of the gray channel overlap over a predetermined percentage.

12. A portable terminal having a built-in camera for color temperature correction comprising:
- a white balance check unit for analyzing a captured image with histograms of red, green, blue and gray channels and determining whether the histogram of the RGB channels and the histogram of the gray channel overlap over a predetermined percentage, and outputting the captured image without performing color temperature correction if the histogram of the RGB channels and the histogram of the gray channel do not overlap over a predetermined percentage; and
- a gamma correction unit for gamma correcting the captured image from the white balance check unit.

13. A computer-readable medium having recorded thereon a program for color temperature correction in a portable terminal having a built-in camera, comprising:
- a first code segment, for analyzing a captured image with histograms of red, green, blue and gray channels;
- a second code segment, for determining if the histogram of the RGB channels and the histogram of the gray channel overlap;
- a third code segment, for measuring each color distribution average value of the RGB channels if the histogram of the RGB channels and the histogram of the gray channel overlap; and
- a fourth code segment, for performing a color temperature correction using the color distribution average value measured in each of the RGB channels on the captured image.

14. A computer-readable medium having recorded thereon a program for color temperature correction in a portable terminal having a built-in camera, comprising:
- a first code segment, for analyzing a captured image with histograms of red, green, blue and gray channels;
- a second code segment, for determining whether the histogram of the RGB channels and the histogram of the gray channel overlap; and
- a third code segment, for performing a color temperature correction on the captured image if the histogram of the RGB channels and the histogram of the gray channel overlap.

* * * * *